(12) United States Patent
Sayers et al.

(10) Patent No.: US 7,639,918 B2
(45) Date of Patent: Dec. 29, 2009

(54) MANIFOLD-TYPE LIGHTGUIDE WITH REDUCED THICKNESS

(75) Inventors: Edwin Mitchell Sayers, Saline, MI (US); Christopher L. Eichelberger, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 12/114,876

(22) Filed: May 5, 2008

(65) Prior Publication Data
US 2009/0274419 A1    Nov. 5, 2009

(51) Int. Cl.
G02B 6/26 (2006.01)
G02B 6/42 (2006.01)
G02B 6/10 (2006.01)
F21V 7/04 (2006.01)

(52) U.S. Cl. .................. 385/146; 385/31; 385/39; 385/47; 385/901; 362/615; 362/616; 362/617; 362/619; 362/620; 362/621; 362/623; 362/625; 362/626; 362/628

(58) Field of Classification Search .............. 385/146, 385/901, 31, 39, 47; 362/615, 616, 617, 362/619, 620, 621, 623, 625, 626, 628
See application file for complete search history.

(56) References Cited

U.S. PATENT DOCUMENTS

| 4,496,211 A | | 1/1985 | Daniel |
| 5,190,370 A | | 3/1993 | Miller et al. |
| 5,339,179 A | * | 8/1994 | Rudisill et al. ............... 349/65 |
| 5,467,417 A | | 11/1995 | Nakamura et al. |
| 5,640,483 A | * | 6/1997 | Lin ............................ 385/146 |
| 5,659,410 A | * | 8/1997 | Koike et al. ................. 349/62 |
| 5,703,667 A | | 12/1997 | Ochiai |
| 5,748,828 A | * | 5/1998 | Steiner et al. .............. 385/146 |

(Continued)

FOREIGN PATENT DOCUMENTS

EP    0 900 694 B1    8/2003

(Continued)

OTHER PUBLICATIONS

U.S. Appl. No. 11/687,493, filed Mar. 16, 2007, Eichelberger.

*Primary Examiner*—Ryan Lepisto
(74) *Attorney, Agent, or Firm*—Brinks Hofer Gilson & Lione

(57) ABSTRACT

A light guide includes a body having an elongate shape and a plurality of light-reflecting faces and light-emitting faces extending along the body. The light-reflecting faces extend in a stepped fashion along the body in the direction of a longitudinal axis of the light guide and are configured to reflect light rays by the principle of total internal reflection. Each light-emitting face is disposed along the body opposite a corresponding light-reflecting face. Each light-emitting face is configured to emit light reflected by the corresponding light-reflecting face. The light-emitting faces are also disposed on the body in a stepped fashion. Steps of the light-emitting faces correspond to steps of the light-reflecting faces. In another aspect, the light-reflecting faces are separated by stepped-down faces. The stepped-down faces are oriented at a stepped-down angle in the range of about 1 and 10 degrees with respect to the longitudinal axis of the light guide.

11 Claims, 12 Drawing Sheets

U.S. PATENT DOCUMENTS

| | | | |
|---|---|---|---|
| 5,914,760 A | 6/1999 | Daiku | |
| 5,993,020 A | 11/1999 | Koike | |
| 5,999,685 A * | 12/1999 | Goto et al. | 385/146 |
| 6,036,340 A | 3/2000 | Fohl et al. | |
| 6,074,069 A | 6/2000 | Chao-Ching et al. | |
| 6,160,948 A * | 12/2000 | McGaffigan | 385/146 |
| 6,299,334 B1 | 10/2001 | Schwanz et al. | |
| 6,337,946 B1 * | 1/2002 | McGaffigan | 385/146 |
| 6,347,873 B1 * | 2/2002 | Hosseini et al. | 362/624 |
| 6,467,925 B2 | 10/2002 | Egawa et al. | |
| 6,497,505 B2 | 12/2002 | Oneil et al. | |
| 6,508,576 B2 | 1/2003 | Emmelmann et al. | |
| 6,575,584 B1 | 6/2003 | Habraken | |
| 6,576,887 B2 * | 6/2003 | Whitney et al. | 250/227.11 |
| 6,633,722 B1 * | 10/2003 | Kohara et al. | 385/146 |
| 6,659,615 B2 | 12/2003 | Umemoto | |
| 6,724,543 B1 | 4/2004 | Chinniah et al. | |
| 6,811,277 B2 | 11/2004 | Amano | |
| 6,824,284 B2 | 11/2004 | Chinniah et al. | |
| 6,835,440 B1 | 12/2004 | Konishi et al. | |
| 6,837,588 B2 * | 1/2005 | Kunimochi et al. | 362/617 |
| 6,851,815 B2 * | 2/2005 | Lee | 362/23 |
| 6,880,946 B2 * | 4/2005 | Mullen | 362/627 |
| 6,925,243 B2 | 8/2005 | Lin | |
| 6,966,685 B2 * | 11/2005 | Li et al. | 362/616 |
| 7,012,660 B1 | 3/2006 | Umemoto | |
| 7,018,087 B2 | 3/2006 | Yoo | |
| 7,018,088 B2 | 3/2006 | Yu et al. | |
| 7,046,907 B2 * | 5/2006 | Miyashita | 385/146 |
| 7,086,772 B2 | 8/2006 | Hsu et al. | |
| 7,090,365 B2 | 8/2006 | Ogawa et al. | |
| 7,104,678 B2 | 9/2006 | De Lamberterie | |
| 7,104,679 B2 | 9/2006 | Shin et al. | |
| 7,113,670 B2 | 9/2006 | Robinson et al. | |
| 7,114,820 B1 | 10/2006 | Parikka et al. | |
| 7,160,010 B1 | 1/2007 | Chinniah et al. | |
| 7,172,323 B1 | 2/2007 | Knoble et al. | |
| 7,223,004 B2 | 5/2007 | Chen et al. | |
| 7,273,311 B2 * | 9/2007 | Yu | 362/620 |
| 7,278,774 B2 | 10/2007 | Chang | |
| 7,393,132 B2 * | 7/2008 | Chen | 362/620 |
| 7,437,050 B2 * | 10/2008 | Bourdin et al. | 385/146 |
| 2001/0010630 A1 | 8/2001 | Umemoto | |
| 2002/0145860 A1 * | 10/2002 | Lee | 362/26 |
| 2003/0103761 A1 * | 6/2003 | Lam et al. | 385/146 |
| 2004/0190102 A1 * | 9/2004 | Mullen et al. | 359/237 |
| 2004/0202003 A1 | 10/2004 | Lyst, Jr. | |
| 2004/0208471 A1 * | 10/2004 | Chen et al. | 385/146 |
| 2004/0228112 A1 | 11/2004 | Takata | |
| 2004/0257795 A1 | 12/2004 | Yamamoto et al. | |
| 2004/0264911 A1 * | 12/2004 | Toeda et al. | 385/146 |
| 2005/0008320 A1 * | 1/2005 | Lin | 385/146 |
| 2005/0049368 A1 | 3/2005 | Maruyama et al. | |
| 2006/0018623 A1 * | 1/2006 | Yu et al. | 385/146 |
| 2006/0104076 A1 | 5/2006 | Erber | |
| 2006/0104092 A1 | 5/2006 | Feng et al. | |
| 2006/0109686 A1 | 5/2006 | Sugiura | |
| 2006/0262568 A1 | 11/2006 | Blom et al. | |
| 2006/0268576 A1 | 11/2006 | Matsui et al. | |
| 2006/0269213 A1 | 11/2006 | Hwang et al. | |
| 2006/0291243 A1 | 12/2006 | Niioka et al. | |
| 2006/0291244 A1 | 12/2006 | Yang et al. | |
| 2006/0291248 A1 * | 12/2006 | Yu | 362/615 |
| 2007/0019434 A1 | 1/2007 | Lee | |
| 2007/0097710 A1 | 5/2007 | Chang et al. | |

FOREIGN PATENT DOCUMENTS

| | | |
|---|---|---|
| EP | 1 176 360 B1 | 2/2004 |
| EP | 1 055 867 B1 | 4/2004 |
| EP | 1 154 197 A3 | 5/2004 |
| EP | 1 170 545 B1 | 10/2004 |

* cited by examiner

MANIFOLD-TYPE LIGHTGUIDE WITH REDUCED THICKNESS

BACKGROUND OF THE INVENTION

1. Field of the Invention

The present invention generally relates to illuminating devices and, more specifically, to light pipes and light guides. The assembly according to the present invention will find utility in vehicle lighting systems, as well as in a variety of non-automotive illumination applications.

2. Description of Related Art

Light pipes and light guides are used in exterior vehicle lighting applications and a variety of other applications, such as interior vehicle lighting applications, interior and exterior architectural lighting, and backlighting for liquid crystal display screens. A plurality of prisms, prismatic cuts, steps, or angled surfaces are formed within the light guide, which are intended to reflect light out of a side of the light guide. Typically, the angled surfaces are disposed on one face of the light guide and a light-emitting face is disposed opposite the angled surfaces. Light rays entering an end of the light guide are incident at the surface of the angled surfaces, and are reflected back through the cross-section of the light guide so as to exit the light guide through the light-emitting face, which is disposed opposite the face having the angled surfaces, as noted above.

Light guides can be oriented vertically or horizontally. The angled surfaces are typically designed with large angles of inclusion, such as 45°, so that when a light beam traveling within the light guide hits a particular angled surface, the light beam is totally internally reflected and exits the light guide through the surface opposite the angled surface.

With reference to FIGS. 1 and 2, a light guide or light manifold 20 is illustrated. A collimated light source S is located at one end of the light manifold 20 and generates light rays 22. The light rays 22 enter a light-receiving face 24 of the manifold 20. The back side 26 of the light manifold 20 includes gradual steps 28, generally angled at 45 degrees to the direction of the incoming light (i.e., with reference to FIG. 2, α is approximately 45°). The angled steps 28 generally reflect the light rays 22 via total internal reflection (TIR) back through the light manifold 20 and out the light-emitting face 30.

The resulting shape of the light manifold 20 is roughly triangular—thick near the light source S and thin at the distal end 32. For a given length, the size and spacing of the 45-degree steps 28 will determine the maximum thickness of the light manifold 20. Customer styling is moving toward a uniform lit appearance, which means the pitch P between steps 28 is preferably small (for example, on the order of about 1-2.5 mm). Thus, for a long or tall lamp, the thickness T of the light manifold 20 is quite large near the light-receiving face 24. In some cases, the resulting mold cycle times become so great as to be impractical.

One solution has been to change the optical mechanism from TIR to simple reflection by using a metalized reflector having a profile substantially similar to the back surface 26 of the light manifold 20. However, the resulting appearance (both lit and unlit) of the lamp has not been adequate to satisfy customer requirements. Further, in some cases, the signal lamp is in close proximity to an electronic device on the vehicle, such as an antenna, and a metalized reflector may cause electromagnetic interference therewith.

Therefore, there remains a need for a light guide or light manifold which uses TIR principles to reflect light, while remaining within an acceptable thickness for purposes of manufacturing and packaging.

BRIEF SUMMARY OF THE INVENTION

The present invention provides a light guide or light manifold having a reduced thickness, which reflects light using TIR principles.

In some embodiments, the light-emitting surface of the light manifold, or light guide, is stepped back to more closely match the shape of the back surface, so that a nearly constant material thickness is maintained. In other embodiments, the straight section between 45-degree steps is angled to reduce the overall thickness of the light manifold.

In one aspect, a light guide is provided that includes a body having an elongate shape and a plurality of light-reflecting faces and light-emitting faces extending along the body. The plurality of light-reflecting faces extends along the body in the direction of a longitudinal axis of the light guide. The plurality of light-reflecting faces is disposed in a stepped fashion and is configured to reflect light rays by the principle of total internal reflection. The plurality of light-emitting faces is disposed along the body opposite the plurality of light-reflecting faces. Each light-emitting face is disposed opposite a corresponding light-reflecting face. Each light-emitting face is configured to emit light reflected by the corresponding light-reflecting face. The plurality of light-emitting faces is disposed on the body in a stepped fashion, wherein steps of the plurality of light-emitting faces correspond to steps of the plurality of light-reflecting faces.

In another aspect, a light guide is provided that includes a body having an elongate shape, at least one light-emitting face disposed along the body, and a plurality of light-reflecting faces disposed along the body opposite the light-emitting face. The light guide is configured to receive light rays in the direction of a longitudinal axis. The light-emitting face is disposed along the body in the direction of the longitudinal axis. The plurality of light-reflecting faces are disposed opposite the light-emitting face and are configured to reflect light rays by the principle of total internal reflection to emit the light rays through the light-emitting face. The light-reflecting faces are separated by a plurality of stepped-down faces. Each of the stepped-down faces are oriented at a stepped-down angle in the range of greater than 3 degrees to about 10 degrees with respect to the longitudinal axis of the light guide.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
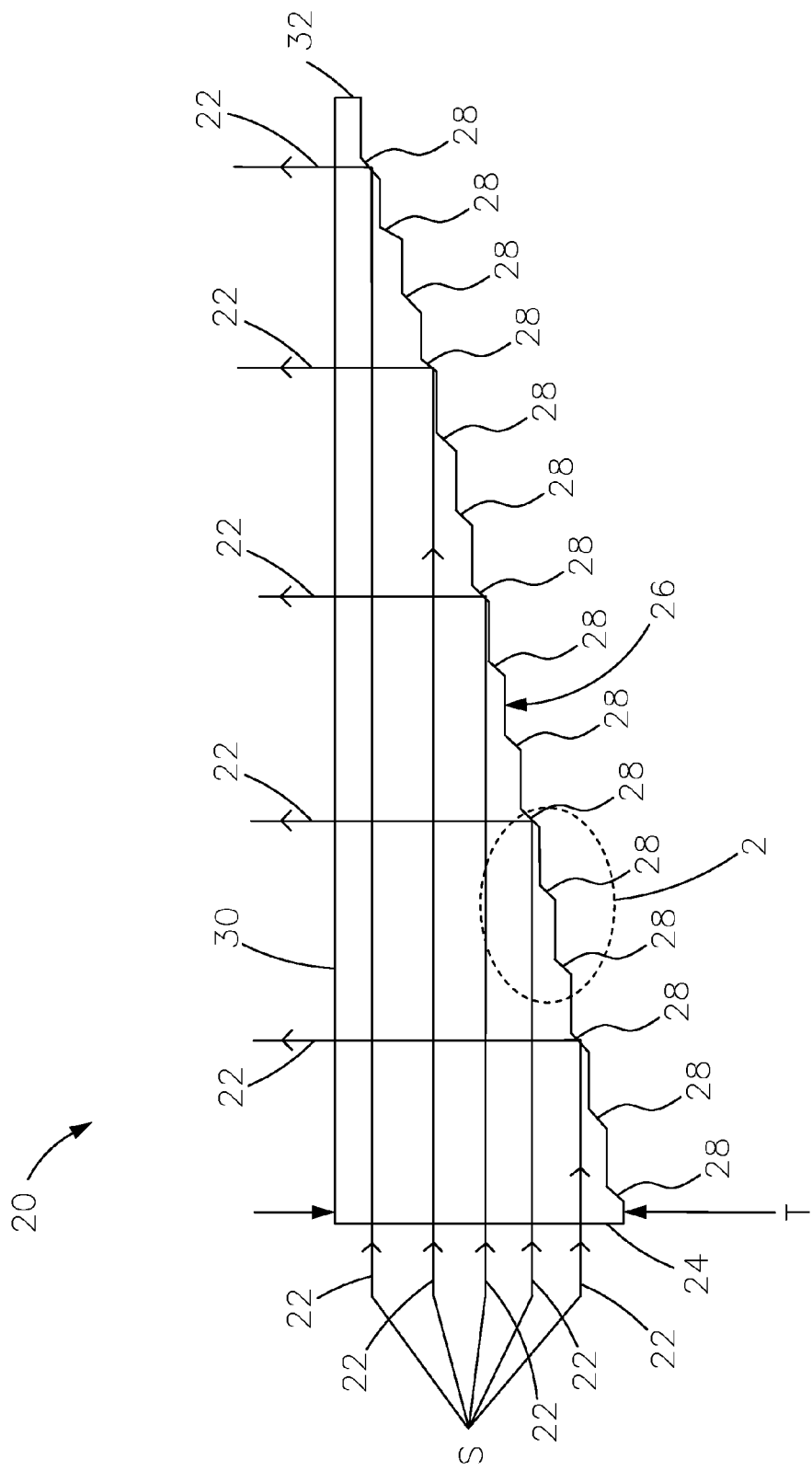
FIG. 1 is a schematic side view of a known light manifold.
Figure 2:
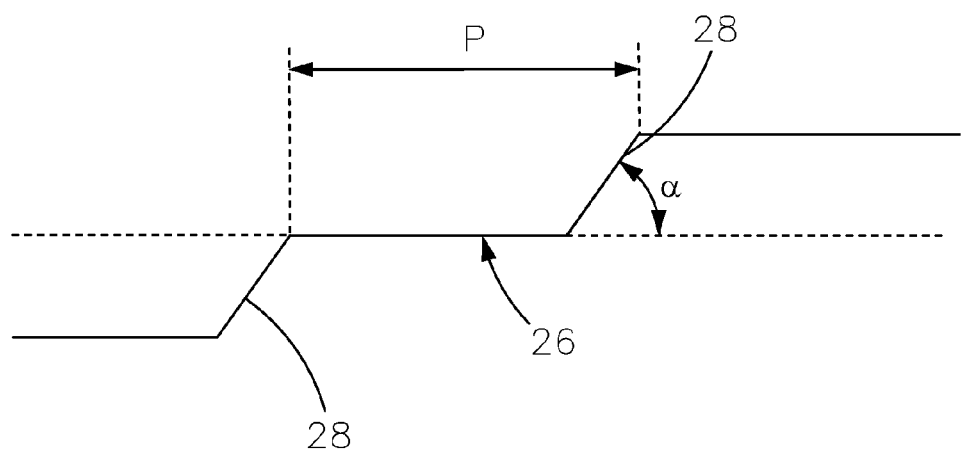
FIG. 2 is a schematic side view of a portion of the light manifold of FIG. 1, taken along the cut-out 2 of FIG. 1.

The following description is merely exemplary in nature and is not intended to limit the present disclosure, application, or uses.

Referring now to FIGS. 3A-6, a portion of a light manifold or light guide is illustrated and generally designated at 40. The light guide 40 has a body 42 constructed of light-transmitting material and having an elongate shape. A plurality of angled light-reflecting faces 44 is disposed along the body 42 in the direction of a longitudinal axis L.

More particularly, the back surface 46 of the body 42 includes a plurality of prisms, prismatic cuts, or angled surfaces (which may be flat or curved). These surfaces are arranged in a stepped fashion, forming the plurality of light-reflecting faces 44. The light-reflecting faces 44 are arranged at angles with respect to the longitudinal axis L of the light guide 40, so that light rays 48 traveling generally in the direction of the longitudinal axis L will be incident on the light-reflecting faces 44.

Figure 4:
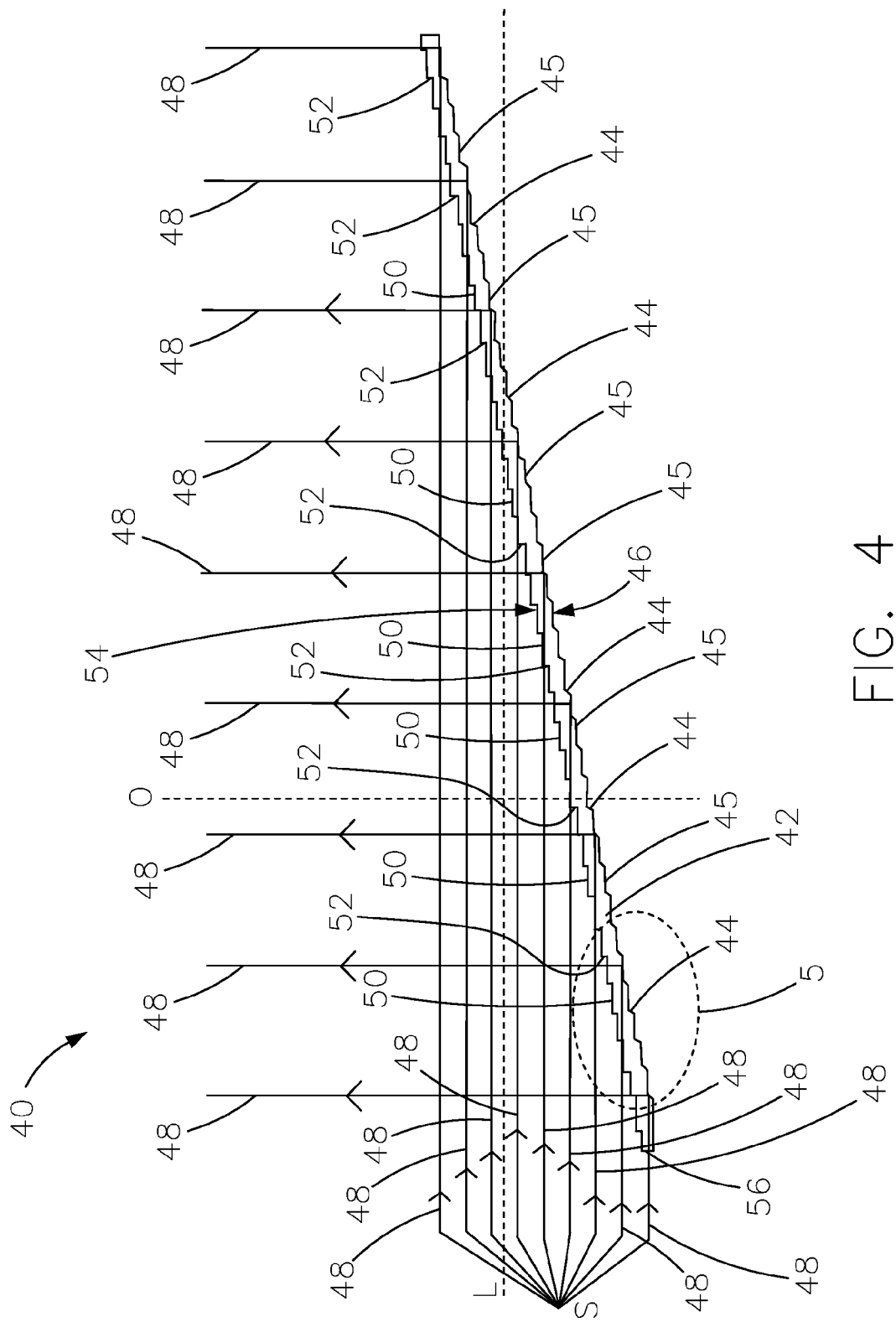
FIG. 4 is a schematic side view of the light guide of FIGS. 3A and 3B.
Figure 5:
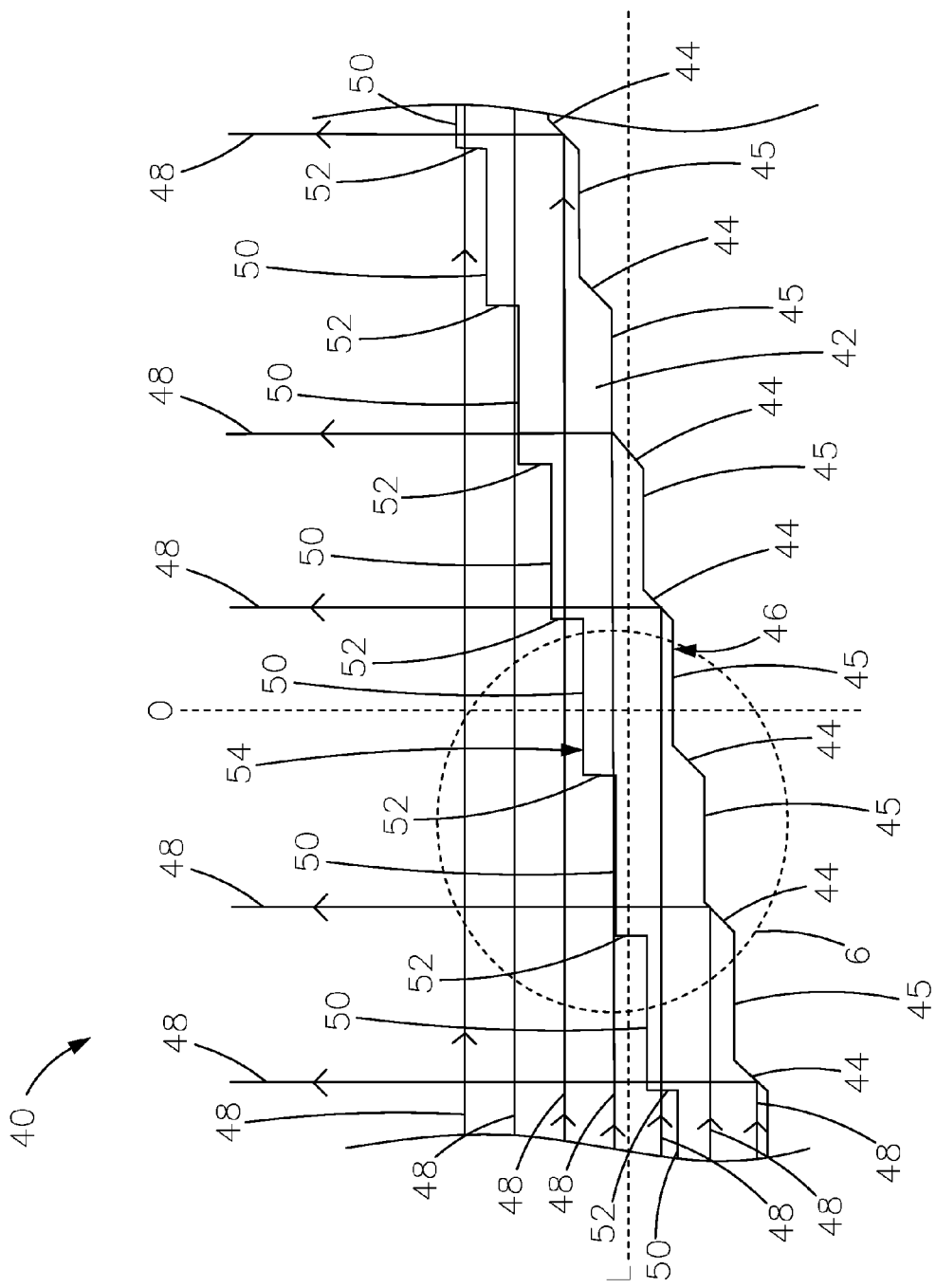
FIG. 5 is a schematic side view of a portion of the light guide of FIG. 4, taken along the cut-out 5 of FIG. 4.
Figure 6:
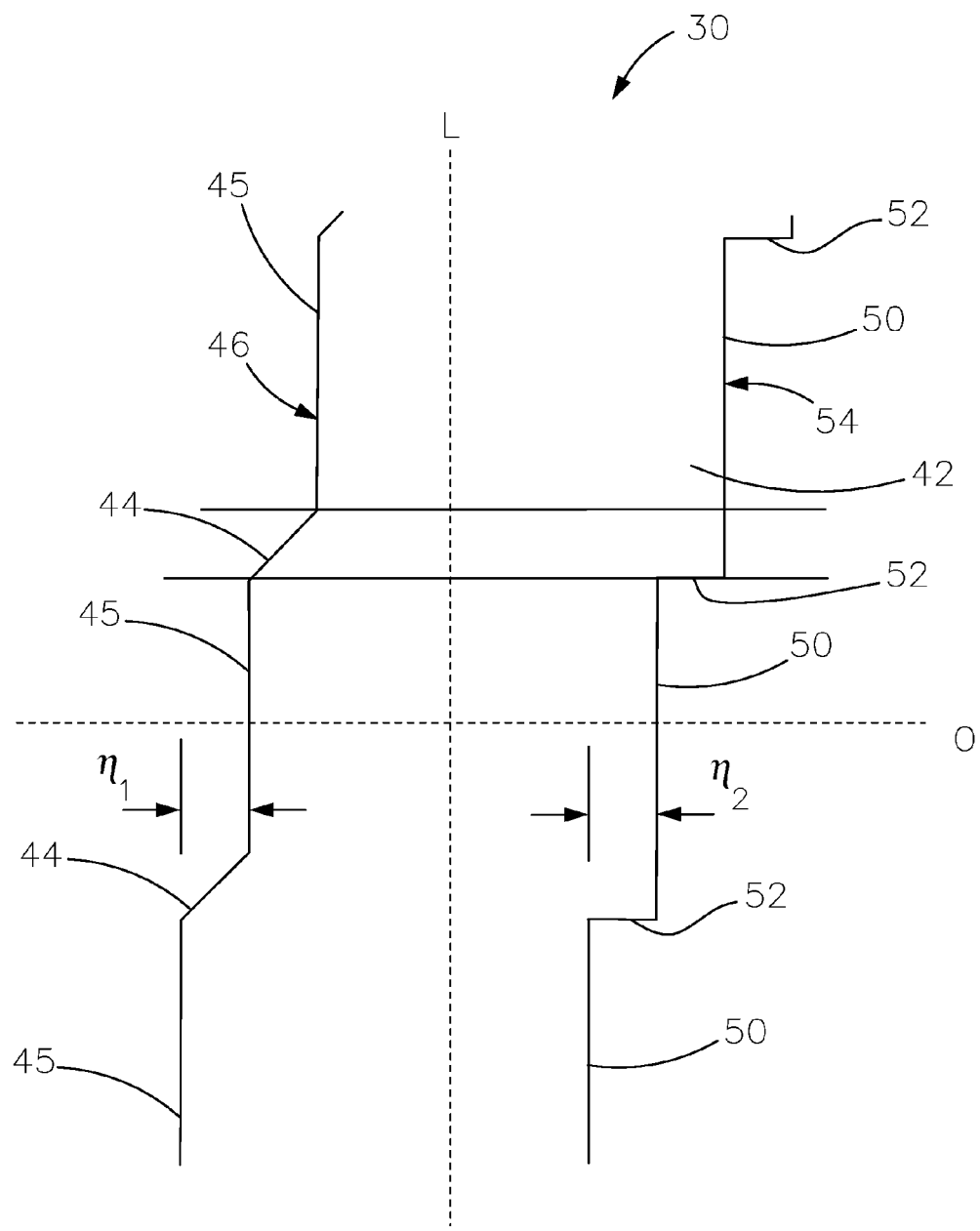
FIG. 6 is a schematic side view of a portion of the light guide of FIG. 5, taken along the cut-out 6 of FIG. 5.

Thus, the back surface 46 of the body 42 includes an alternating series of light-reflecting faces 44 and lateral surfaces 45. The light-reflecting faces 44 are angled surfaces, which are angled relative to both the longitudinal axis L and the optical axis O of the light guide 40. The light-reflecting faces 44 are positioned sequentially along the body 42 moving in the direction of the longitudinal axis L to reflect the light rays 48 in the direction of the optical axis O along sequential longitudinal positions along the body 42 of the light guide 40. For purposes herein, the longitudinal axis L is the direction in which collimated light rays 48 are generally received in the light guide 40, as shown in FIGS. 4 and 5, and the optical axis O is the direction in which the light rays 48 are generally emitted from the light guide 40. In some embodiments, the optical axis O is generally perpendicular to the longitudinal axis L, such that the optical axis O is perpendicular to the direction of the collimated light rays 48 that enter the light guide 40.

The lateral surfaces 45 may be generally parallel to the longitudinal axis L, such that the lateral surfaces 45 typically do not reflect the light rays 48. In the alternative, the lateral surfaces 45 could be stepped down away from the longitudinal axis L, which is described in more detail below with reference to FIGS. 9 and 10. In still other alternatives, the lateral surfaces 45 could have other configurations, such as being oriented at an angle with respect to the longitudinal axis L.

In some variations, the light-reflecting faces 44 are arranged at angles of total internal reflection (TIR), for example, about 45° for some materials, such that light rays 48 incident thereon will be totally internally reflected by the light-reflecting faces 44 back through the body 42 and out of the light guide 40 through the light-emitting faces 50. In other words, the angled surfaces of the light-reflecting faces 44 may be oriented at about 45° with respect to the longitudinal axis L of the light guide 40, or any other angle that would cause incident light rays 48 traveling in the direction of the longitudinal axis L to be totally internally reflected at the light-reflecting surface 44.

In the alternative, the light-reflecting faces 44 could be oriented at an angle larger or smaller than an angle required for total internal reflection, such that total internal reflection does not occur when light rays 48 traveling in the direction of the longitudinal axis L are incident on the light-reflecting faces 44. For example, the light-reflecting faces 44 could be oriented such that light rays 48 incident thereon pass through one or more light-reflecting face 44 and are refracted thereby before being totally internally reflected. For more details on this concept, see the U.S. patent application Ser. No. 11/687,493, which is hereby incorporated by reference in its entirety.

In some embodiments, the light-reflecting faces 44 are substantially flat, as shown in FIGS. 3A-6. For these embodiments, it is ideal for the corners of the prismatic cuts, or more particularly, the points separating the light-reflecting faces 44 from the lateral surfaces 45, to be as sharp as possible with a maximum radius of 0.125 mm. In other embodiments, the light-reflecting faces may be curved, which are described in further detail below.

A plurality of light-emitting faces 50 is disposed along the body 42 opposite the plurality of light-reflecting faces 44. Each light-emitting face 50 is disposed opposite a corresponding light-reflecting face 44 and is configured to emit light reflected by the corresponding light-reflecting face 44. The light-emitting faces 50 are oriented substantially perpendicular to the optical axis O, such that light rays 48 may pass through the light-emitting faces 50 substantially unaltered. However, as one having ordinary skill in the art would understand, at least some of the light rays 48 would be at least partially refracted by the light-emitting faces 50.

The light-emitting faces 50 are disposed along the body 42 in a stepped fashion. Each light-emitting face 50 is separated by a light-receiving face 52; thus, each light-receiving face 52 is disposed between a pair of light-emitting faces 50. In other words, an alternating series of light-emitting faces 50 and light-receiving faces 52 are disposed along the light-emitting side 54 of the body 42.

In the variation of FIGS. 3A-6, the light-emitting faces 50 are disposed along the body 42 such that the steps between the light-emitting faces 50 correspond to the steps between each lateral face 45. In other words, the steps of the light-emitting faces 50 correspond to the steps of the light-reflecting faces 44, such that each light-reflecting face 44 is configured to reflect light toward one of the stepped light-emitting faces 50.

In the present embodiment, each light-emitting face 50 corresponds to exactly one light-reflecting face 44; in other words, only one light-emitting face 50 is disposed opposite each light-reflecting face 44, and only one light-reflecting face 44 is disposed opposite each light-emitting face 50. Thus, the length of each light-emitting face 50 is the length of the pitch of the light-reflecting faces 44. It should be understood, however, that there could be other configurations of the light-reflecting and light-emitting faces 44, 50, without falling beyond the spirit and scope of the present invention. For example, one light-emitting face 50 could be disposed opposite a sequence of two light-reflecting faces 44, or there could be multiple light-emitting faces 50 disposed opposite one light-reflecting face 44.

In the variation shown in FIGS. 3A-6, the light-emitting faces 50 are disposed substantially equidistant from each of their corresponding light-reflecting faces 44. More particularly, with reference to FIG. 6, the height $\eta_1$ of each step along the back surface 46 is defined by the height between each lateral surface 45 along the back surface 46, or the height of each light-emitting face 44; and the height $\eta_2$ along the light-emitting side 54 is defined by the height between each light-emitting face 50, or the height of the light-receiving faces 52 on the light-emitting side 54 of the light guide 40. The heights $\eta_1$ are substantially equal to the heights $\eta_2$. In other words, the heights $\eta_2$ of the steps of the plurality of light-emitting faces 50 are substantially equal to the heights $\eta_1$ of the steps of the plurality of light-reflecting faces 44. Thus, the body 42 has a substantially uniform thickness along the length of the light guide 40.

In the variation of FIGS. 3A-6, each light-receiving face 52 separates each light-emitting face 50. Each light-receiving face 52 may be oriented parallel to the optical axis O, as shown in FIGS. 3A-6, or in the alternative, the light-receiving faces 52 could have other orientations, without falling beyond the spirit and scope of the present invention. The light-receiving faces 52 are configured to receive light into the light guide 40. Thus, collimated light rays 48 emanating from a light source S are directed toward the light guide 40 in the direction of the longitudinal axis L, and the light rays 48 enter the light guide 40 through the light-receiving faces 52. The light-receiving faces 52 are positioned sequentially along the body 42 moving in the direction of the longitudinal axis L, such that some light rays 48 enter the light guide 40 at a position closer to the light source S than do others. Some of the light rays 48 may also enter the light guide 40 through a proximal end face 56.

The light source S is preferably provided as one or more light-emitting diodes (LEDs); however, other light sources S may be used, without falling beyond the spirit and scope of the present invention. Preferably, the light source S is combined with collimating optics, which may be formed with or separately from the light guide 40, such that the light rays 40 enter the light guide 40 parallel to the longitudinal axis L of the light guide 40.

Once the light rays 48 enter the light guide 40, either through a light-receiving face 52 or through the proximal end face 56, the light rays 48 travel through the light-transmitting material of the light guide 40 and most become incident on a light-reflecting face 44. The light-reflecting faces 44 are oriented to reflect most light rays 48 by the principles of TIR toward the light-emitting faces 50 in the direction of the optical axis O.

Figure 7:
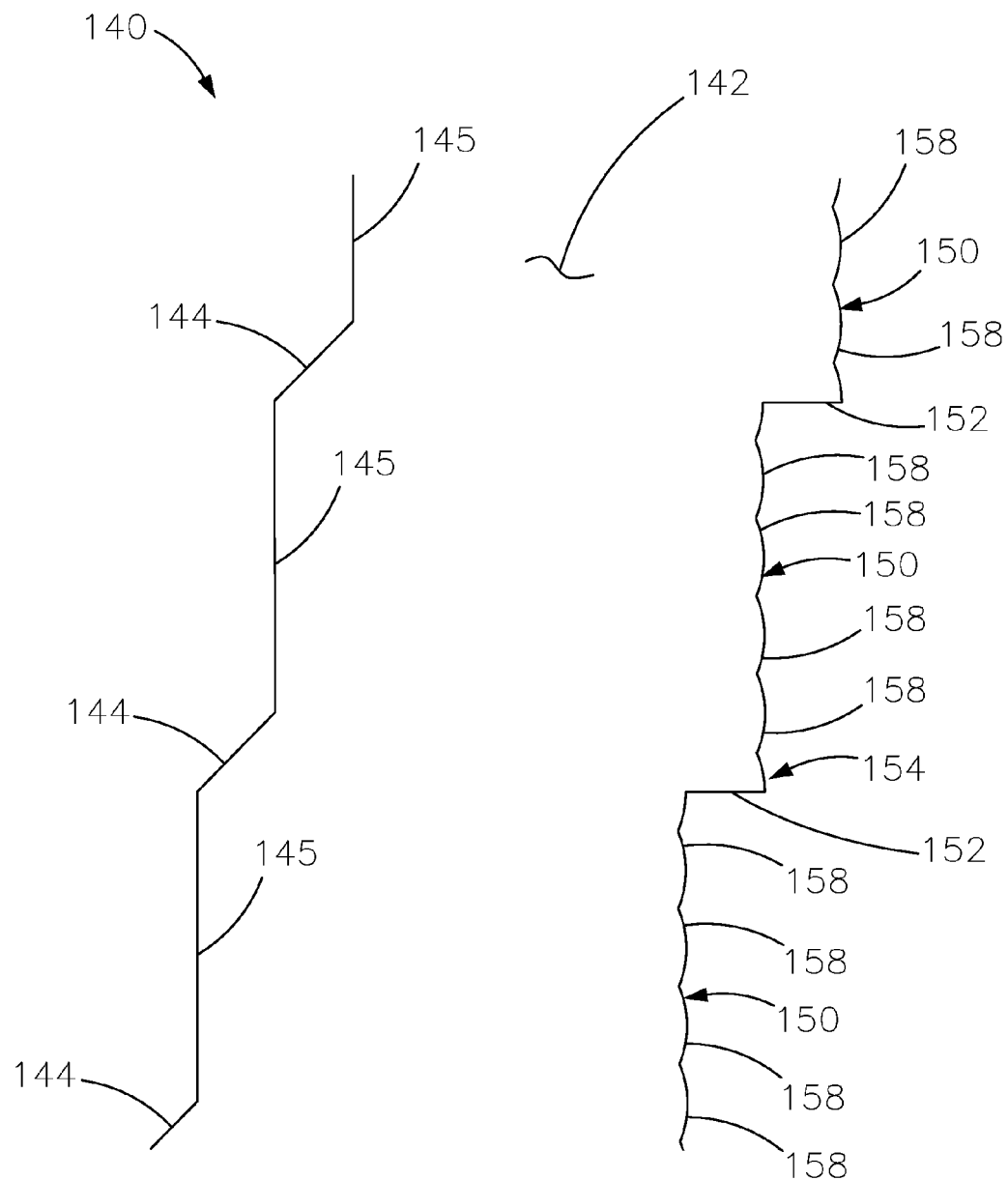
FIG. 7 is a schematic side view of another light guide, in accordance with the principles of the present invention.

Now with reference to FIG. 7, another variation of a portion of a light guide 140 is illustrated. The light guide 140 is substantially similar to the light guide 40 hereinbefore described. For example, the light guide 140 has a body 142 and a plurality of light-reflecting faces 144 disposed along the body 142 with lateral surfaces 145 extending between each light-reflecting face 144, and a plurality of light-emitting faces 150 separated by light-receiving faces 152 disposed along the body 142 opposite the light-reflecting faces 144 and lateral surfaces 145.

In this variation, the light-emitting faces 150 have a plurality of spreading optics 158 disposed thereon or incorporated therewith. The spreading optics 158 may be formed separately or together with the light guide 140. The spreading optics 158 help spread light rays (not shown) exiting the light guide 140 through the light-emitting faces 150, which allows the light guide 140 to provide an improved lit appearance and photometry. Additionally or alternatively, the light-emitting faces 150 could be treated to make them more diffuse to provide an improved lit appearance or photometry.

Figure 8:
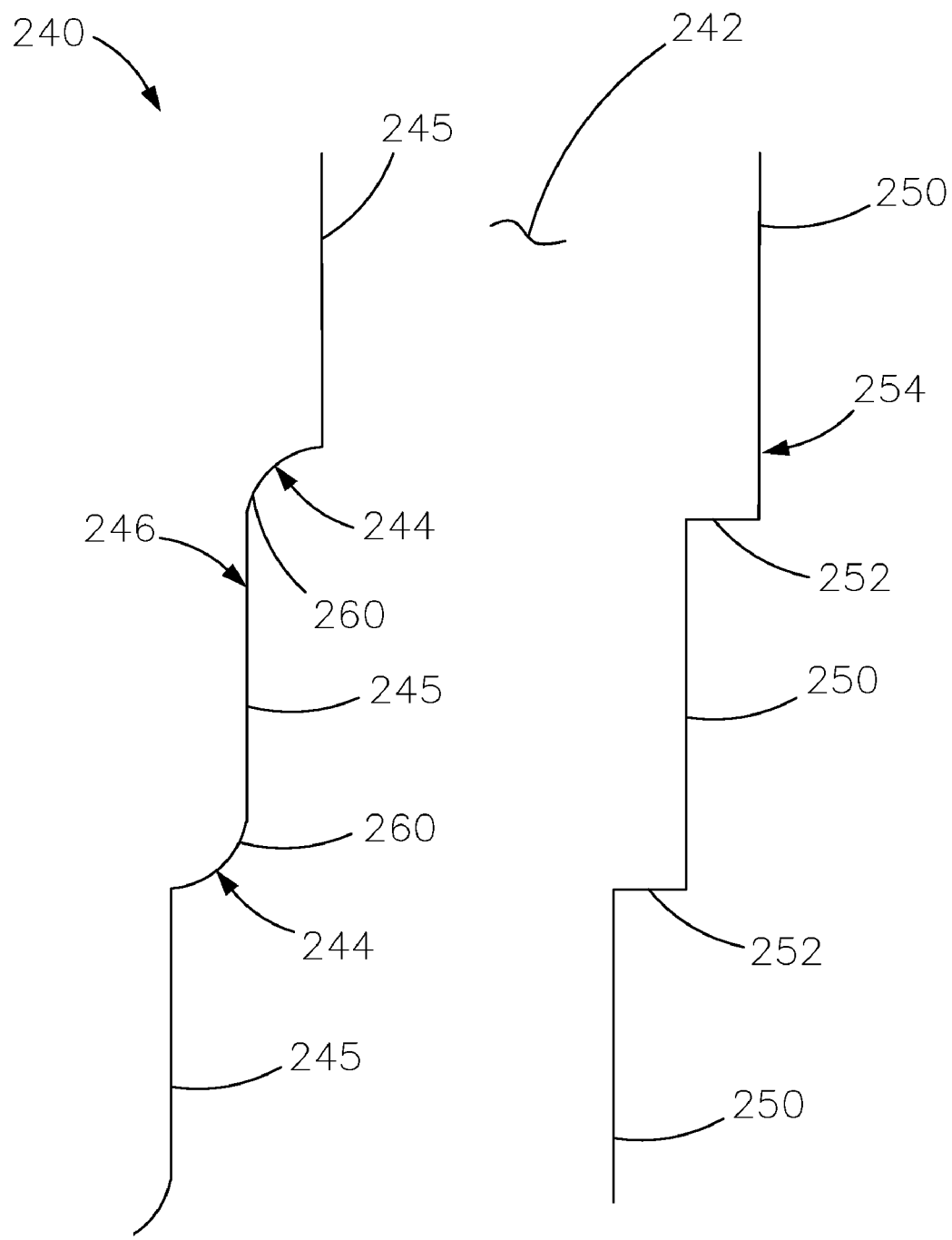
FIG. 8 is a schematic side view of yet another light guide, according to the principles of the present invention.

With reference to FIG. 8, yet another variation of a portion of a light guide 240 is illustrated. The light guide 240 is substantially similar to the light guides 40, 140 hereinbefore described. For example, the light guide 240 has a body 242, and the body 242 has alternating light-reflecting faces 244 and lateral surfaces 245 disposed on a back surface 246 of the body 242 and alternating light-emitting faces 250 and light-receiving faces 252 disposed along a light-emitting side 254 of the body 242, wherein the light-reflecting faces 244 and lateral surfaces 245 are disposed opposite the light-emitting faces 250 and light-receiving faces 252.

The light-reflecting faces 244 each have at least one spreading optic 260 incorporated therewith or disposed thereon. In this variation, the spreading optics 260 are illustrated as curved surfaces, although other configurations of spreading optics could be employed. In other words, instead of being flat, the light-reflecting faces 244 are curved surfaces. The spreading optics 260 of the light-reflecting surfaces 244 reflect light rays incident thereon in a spread pattern. Thus, the light-reflecting faces 244 are configured to spread light rays incident thereon. In addition or in the alternative, the light-reflecting faces 244 could be treated to make them more diffuse to provide an improved lit appearance or photometry.

Figure 9:
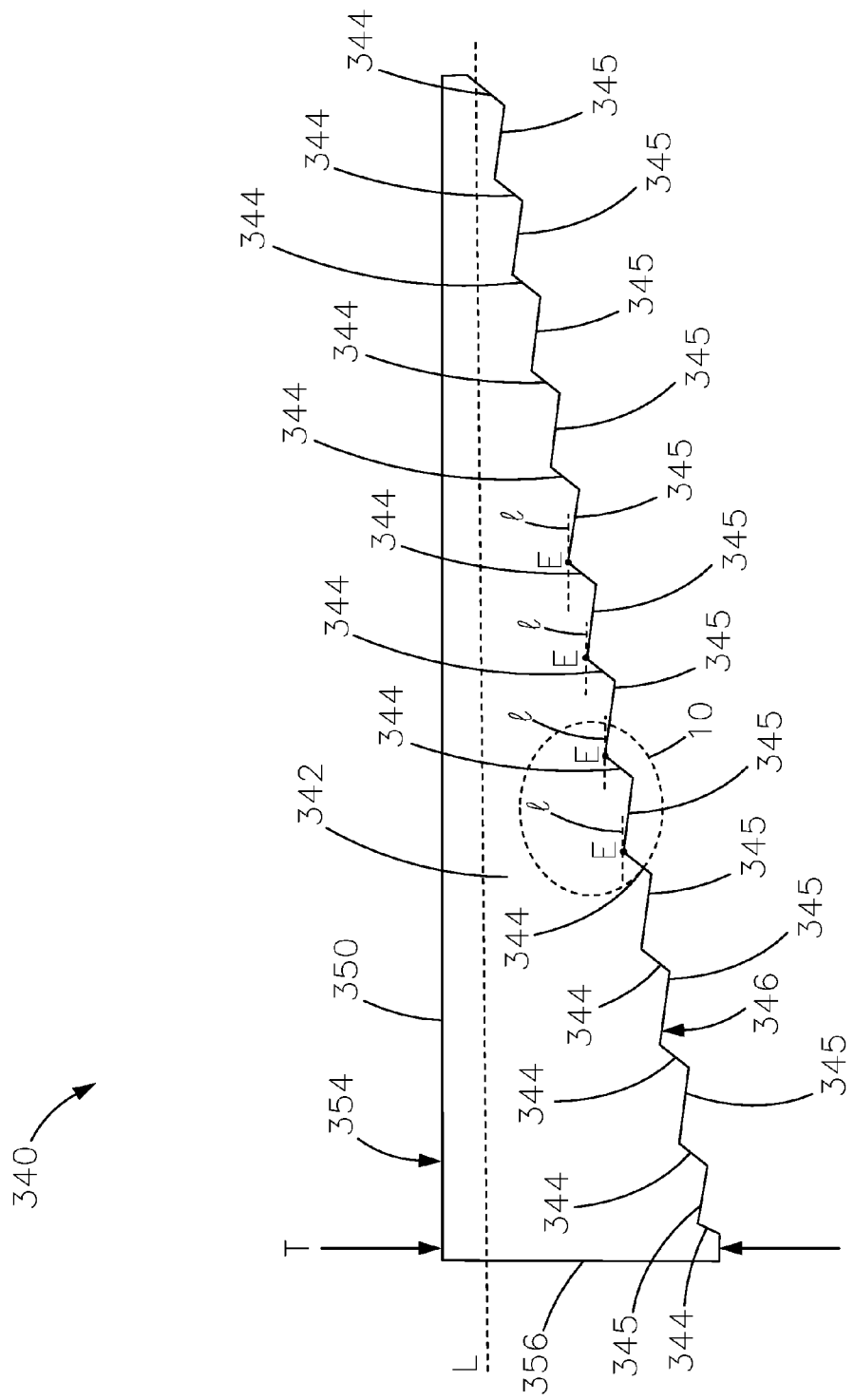
FIG. 9 is a schematic side view of still another light guide, in accordance with the principles of the present invention.
Figure 10:
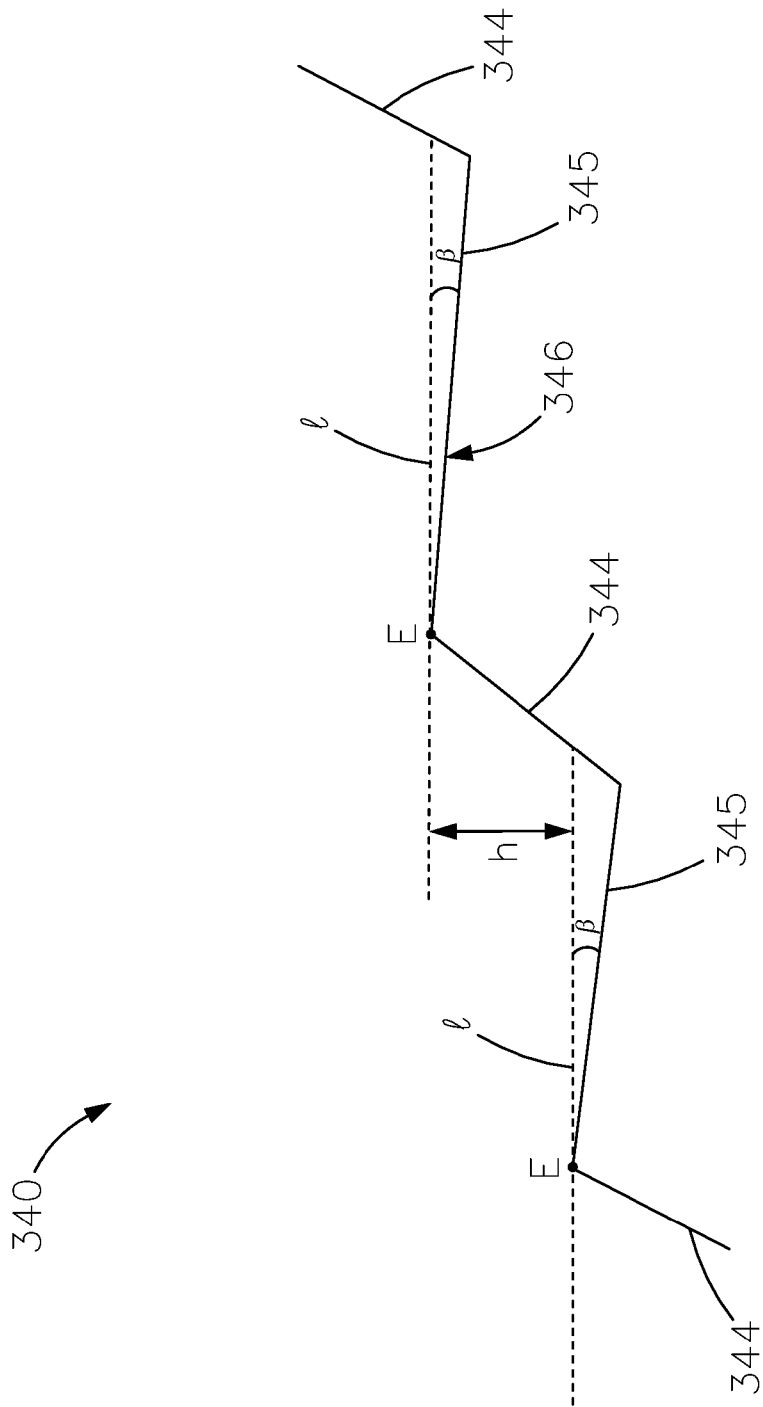
FIG. 10 is a schematic side view of a portion of the light guide of FIG. 9, taken along the cut-out 10 of FIG. 9.

Now with reference to FIGS. 9 and 10, still another variation of a light manifold or light guide 340 is illustrated, in accordance with the principles of the present invention. The light guide 340 includes a body 342 having an elongate shape, which is comprised of a light-transmitting material. The body 342 a plurality of light-reflecting faces 344 disposed along the body 342 in the direction of a longitudinal axis L, and the light-reflecting faces 344 are separated by a plurality of stepped-down surfaces 345. In other words, the body 342 includes a series of alternating light-reflecting faces 344 and stepped-down surfaces 345 disposed longitudinally therealong, which are generally formed into the back side 346 of the light guide 340.

The body 342 of the light guide 340 has a light-emitting face 350 disposed opposite the plurality of light-reflecting faces 344 and stepped-down faces 345. Although a single light-emitting face 350 is illustrated in FIG. 9, it should be understood that the light-emitting face could comprise a plurality of light-emitting faces 350, having a configuration on the body 342 similar to the light-emitting faces 50, 150, 250 hereinbefore described.

The body 342 has a proximal end face 356 configured to receive light rays (not shown) into the light guide 340, in the direction of the longitudinal axis L. The light rays are preferably collimated such that they enter the light guide 340 parallel to the longitudinal axis L. In some variations, particularly variations having a plurality of light-emitting faces 350, light rays could also or alternatively be received into the light guide 340 via a plurality of light-receiving faces, such as the light-receiving faces 52, 152, 252 hereinbefore described.

Similarly to the light-reflecting faces 44, 144, 244 hereinbefore described, the light-reflecting faces 344 of FIGS. 9-10 are configured to reflect light rays generally by the principles of TIR. Thus, when a light ray is incident on a light-reflecting face 344, it will be totally internally reflected within the light guide 340, and the light ray will be emitted from the light guide 340 via the light-emitting face 350; however, it should be understood that in some variations the light-reflecting faces 344 could also be configured to refract light rays therethrough before totally internally reflecting the light rays.

Each stepped-down face 345 is oriented at a stepped-down angle $\beta$ with respect to the longitudinal axis L of the light guide 340. Starting at a line l extending from an end E of each light-reflecting face, the line l being parallel to the longitudinal axis L, the stepped-down angle $\beta$ as used herein is measured downward and away from the light-emitting face 350. In other words, the stepped-down angle $\beta$ extends from the line l away from the direction that light is emitted from the light guide 340 through the light-emitting face 350.

The stepped-down angle $\beta$ may be in the range of about 1 and 10 degrees with respect to the longitudinal axis L of the light guide 340. In some variations, the range of the stepped-down angle $\beta$ is greater than 3 degrees up to about 10 degrees with respect to the longitudinal axis L of the light guide 340.

For example, the range of the stepped-down angle β could be greater than 3 degrees up to about 5 degrees, or the stepped-down angle β could be in the range of about 4 and 7 degrees.

In some variations, the light-emitting face 350 is flat and disposed along a light-emitting plane, which is substantially parallel to the longitudinal axis L. In such cases, the stepped-down angle β may be in the range of about 1 and 10 degrees with respect to the light-emitting plane, for example, the stepped-down angle β could be in the range of greater than 3 degrees up to about 10 degrees with respect to the light-emitting plane.

By providing a stepped-down face 345 between each light-reflecting face 344, the height h between corresponding tips of each light-reflecting face 344 is lesser than it would be if the stepped-down faces 345 were parallel to the longitudinal axis L. In this way, the overall thickness T of the light guide 340 is reduced.

Similarly to the embodiments shown and described with respect to FIGS. 7 and 8, the light guide 340 of FIGS. 9 and 10 could have a plurality of spreading optics, to spread light rays, disposed on or incorporated with either or both of the plurality of light-reflecting faces 344 and the light-emitting face 350. The spreading optics could be configured as shown in FIGS. 7 and 8, or they could have other configurations, without falling beyond the spirit and scope of the present invention.

The bodies 42, 142, 244, 344 of the light guides 40, 140, 240, 340 may be constructed of any light-transmitting material. For example, the bodies 42, 142, 242, 342 may be constructed of a plastic material, such as polymethylmethacrylate (PMMA), which is commonly known as acrylic, or polycarbonate. Other optical grade plastics are also suitable. It is preferred that all surfaces of the light guides 40, 140, 240, 340 have a "Class A" finish.

In some forms, the bodies 42, 142, 242, 342 of the light guides 40, 140, 240, 340 are solid, which lessens the number of times that the light rays 48 are refracted. In other words, the plastic material extends between the light-emitting faces 50, 150, 250, 350 and the light-reflecting faces 44, 144, 244, 344. In some variations, it is preferred that the straight sections on the light-emitting sides 54, 154, 254, 354 of the light guides 40, 140, 240, 340 be constructed with minimum draft angles preferably within 3 degrees of perfectly parallel to the longitudinal axis L or perpendicular to the optical axis O.

The light guides 40, 140, 240, 340 shown and described herein have a reduced thickness while maintaining principles of TIR. Therefore, although metallization could be used, it is not required. Thus, in some variations, the light guides 40, 140, 240, 340 are provided substantially free of metallization.

Figure 3A:
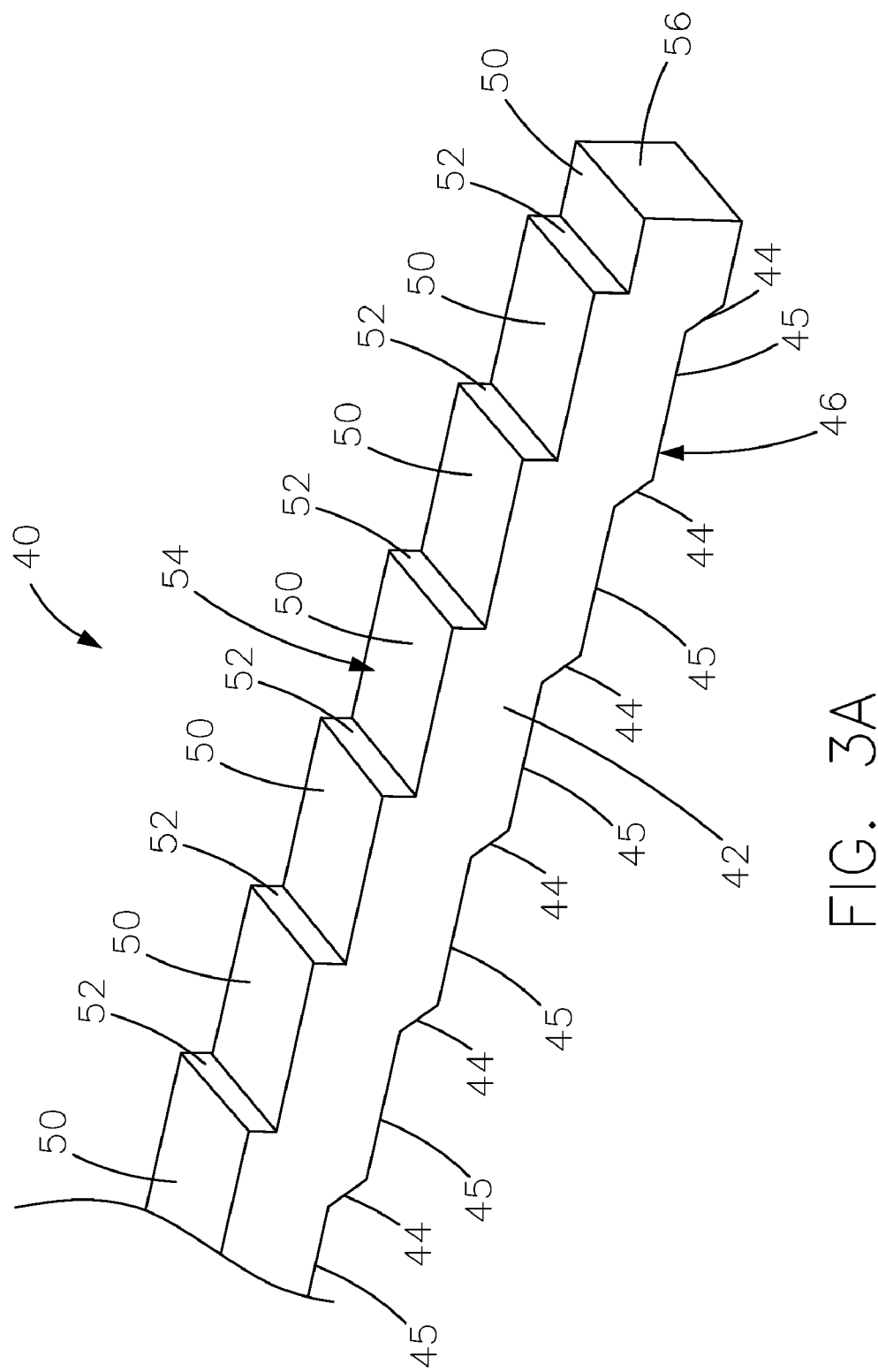
FIG. 3A is a perspective view of a portion of a light guide showing a light-emitting side thereof, in accordance with the principles of the present invention.
Figure 3B:
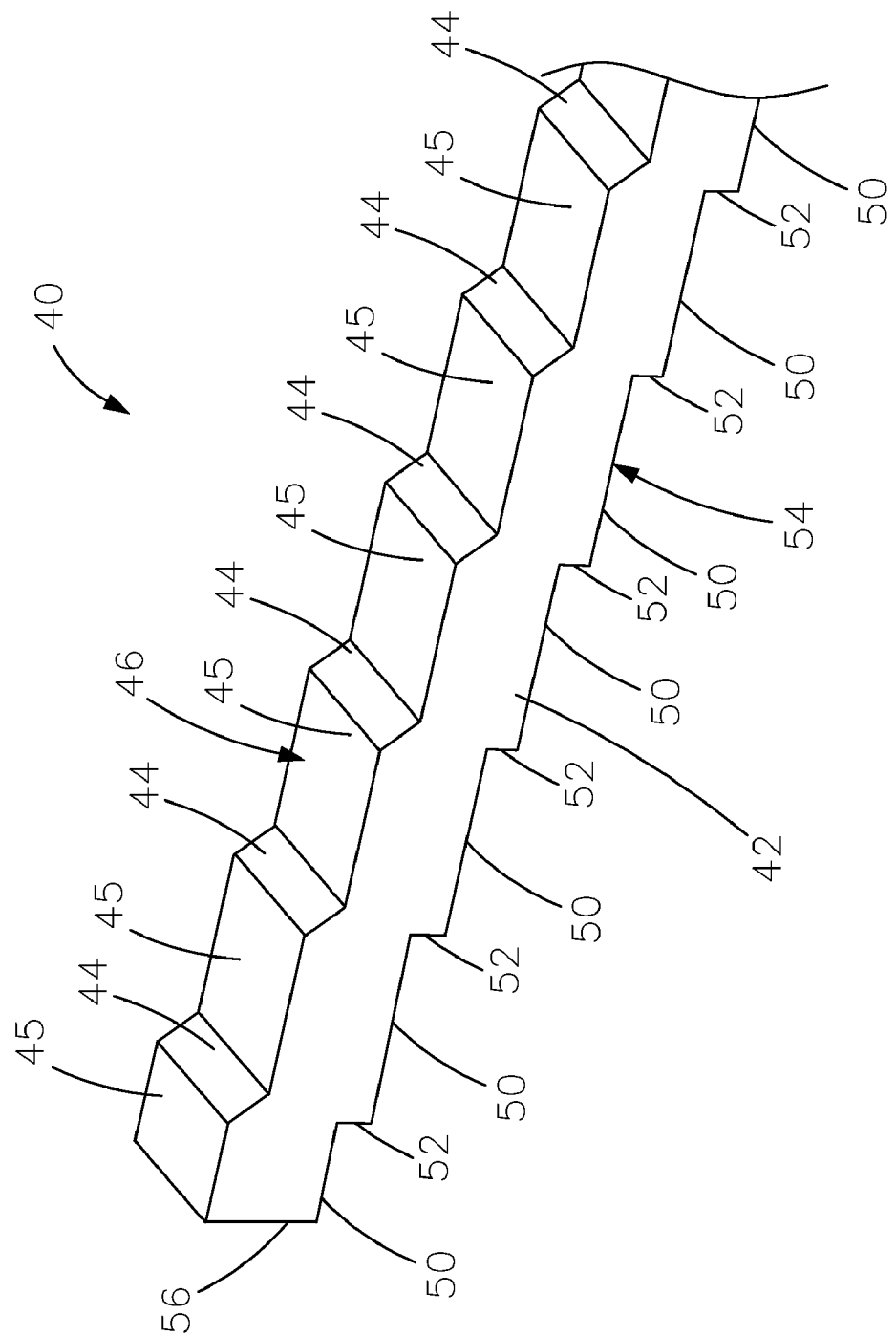
FIG. 3B is a perspective view of the portion of the light guide of FIG. 3A, showing a light-reflecting side of the light guide.

Referring to FIGS. 3A-3B, the light guide 40 could have a rectangular cross-section as shown. The cross-section of the light guide 40 could have other configurations, however, such as an ovular or circular cross-section.

Figure 11:
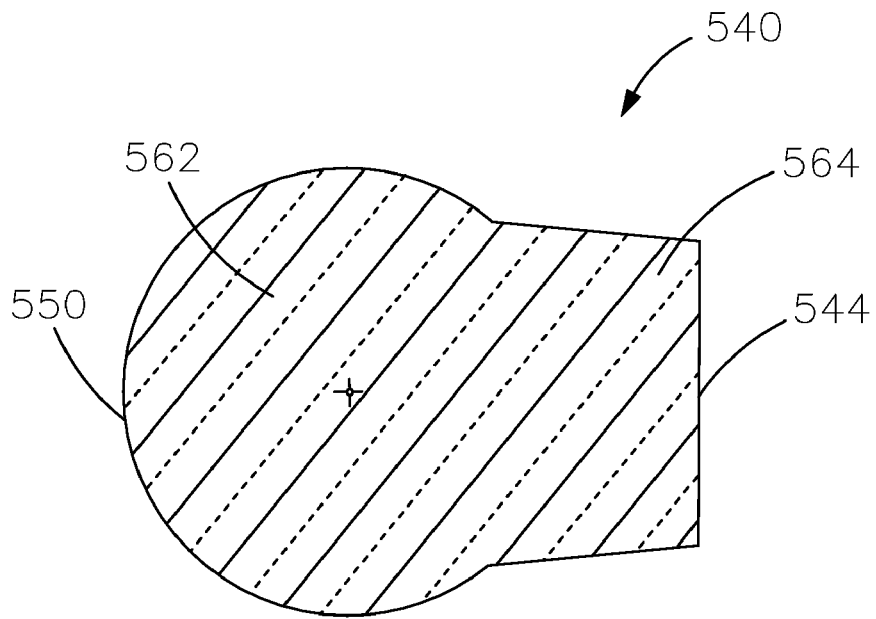
FIG. 11 is a cross-sectional view of a light guide, according to the principles of the present invention.
Figure 12:
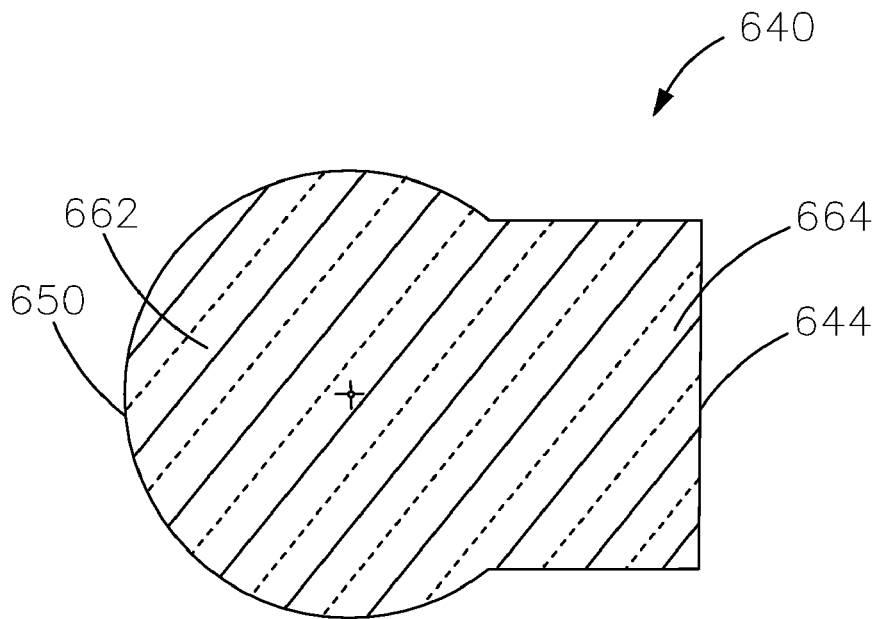
FIG. 12 is a cross-sectional view of a light guide, in accordance with the principles of the present invention.

With reference to FIG. 11, one variation of a cross-section for a light guide 540 in accordance with the present invention is illustrated. In this variation, the light guide 540 has a cross-section comprising a circular portion 562 combined with a trapezoidal portion 564. The light-emitting face or faces 550 are located on the circular portion 562 of the cross-section and the light-reflecting faces 544 are located on the trapezoidal portion 564 of the cross-section of the light guide 540.

Referring to FIG. 9, another variation of the cross-section of a light guide 640 is shown. The light guide 640 has a cross-section comprising a circular portion 662 combined with a rectangular portion 664, with the light-emitting face or faces 650 being located on the circular portion 662 of the cross-section and the light-reflecting faces 644 being located on the rectangular portion 664. It is contemplated that the cross-section could be of any other suitable configuration, especially for other applications, without falling beyond the spirit and scope of the present invention. For example, the cross-section could comprise an elliptical portion combined with a trapezoidal or rectangular portion, or a rectangular portion having rounded corners combined with a second rectangular portion or trapezoidal portion.

The present disclosure is merely exemplary in nature and, thus, variations that do not depart from the gist of the disclosure are intended to be within the scope of the present disclosure. Such variations are not to be regarded as a departure from the spirit and scope of the present disclosure.

The invention claimed is:

1. A light guide comprising:
   a body having an elongate shape;
   a plurality of light-reflecting faces extending along the body in the direction of a longitudinal axis of the light guide, the plurality of light-reflecting faces being disposed in a stepped fashion, the plurality of light-reflecting faces being configured to reflect light rays by the principle of total internal reflection;
   a plurality of light-emitting faces disposed along the body opposite the plurality of light-reflecting faces, each light-emitting face of the plurality of light-emitting faces being disposed opposite a corresponding light-reflecting face and being configured to emit light reflected by the corresponding light-reflecting face, the plurality of light-emitting faces being disposed on the body in a stepped fashion, wherein steps of the plurality of light-emitting faces correspond to steps of the plurality of light-reflecting faces; and
   a plurality of light-receiving faces disposed on the body, the plurality of light-receiving faces being configured to receive light into the light guide.

2. The light guide of claim 1, wherein each of the light-emitting faces are disposed substantially equidistant from each of their corresponding light-reflecting faces.

3. The light guide of claim 1, wherein each light-reflecting face is substantially flat.

4. The light guide of claim 1, wherein each light-receiving face is disposed between a pair of light-emitting faces.

5. The light guide of claim 1, wherein the steps of the plurality of light-emitting faces have first heights and the steps of the plurality of light-reflecting faces have second heights, the first heights being substantially equal to the second heights.

6. The light guide of claim 1, wherein the plurality of light-emitting faces has a plurality of spreading optics disposed thereon.

7. The light guide of claim 1, wherein each light-reflecting face has at least one spreading optic incorporated therewith.

8. The light guide of claim 1, wherein each light-reflecting face is curved, the plurality of light-reflecting faces being configured to spread light rays.

9. The light guide of claim 1, wherein the body is comprised of a plastic material.

10. The light guide of claim 9, wherein the light guide is solid, the plastic material extending between the plurality of light-emitting faces and the plurality of light-reflecting faces.

11. The light guide of claim 1, the body having a substantially uniform thickness along the length of the light guide.

* * * * *